United States Patent
Benhase et al.

(10) Patent No.: US 9,075,723 B2
(45) Date of Patent: *Jul. 7, 2015

(54) EFFICIENT DISCARD SCANS

(75) Inventors: Michael T. Benhase, Tucson, AZ (US);
Lokesh M. Gupta, Tucson, AZ (US);
Carol S. Mellgren, Tucson, AZ (US);
Kenneth W. Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 751 days.

This patent is subject to a terminal disclaimer.

(21) Appl. No.: 13/162,823

(22) Filed: Jun. 17, 2011

(65) Prior Publication Data

US 2012/0324173 A1 Dec. 20, 2012

(51) Int. Cl.
G06F 12/00 (2006.01)
G06F 12/08 (2006.01)
G06F 12/12 (2006.01)

(52) U.S. Cl.
CPC .......... *G06F 12/0817* (2013.01); *G06F 12/121* (2013.01)

(58) Field of Classification Search
None
See application file for complete search history.

(56) References Cited

U.S. PATENT DOCUMENTS

| | | | |
|---|---|---|---|
| 4,414,644 A | 11/1983 | Tayler | |
| 5,537,574 A * | 7/1996 | Elko et al. | 711/141 |
| 5,544,345 A * | 8/1996 | Carpenter et al. | 711/150 |
| 6,122,714 A * | 9/2000 | VanDoren et al. | 711/150 |
| 6,154,816 A * | 11/2000 | Steely et al. | 711/150 |
| 6,279,084 B1 * | 8/2001 | VanDoren et al. | 711/141 |
| 6,658,652 B1 * | 12/2003 | Alexander et al. | 717/128 |
| 6,738,865 B1 | 5/2004 | Burton et al. | |
| 6,785,771 B2 | 8/2004 | Ash et al. | |
| 7,421,535 B2 | 9/2008 | Jarvis et al. | |
| 7,552,295 B2 * | 6/2009 | Kern et al. | 711/162 |
| 7,694,096 B2 * | 4/2010 | Haustein et al. | 711/163 |
| 7,721,063 B2 * | 5/2010 | Ontko | 711/170 |
| 7,734,883 B2 * | 6/2010 | Spear et al. | 711/162 |
| 7,797,498 B2 | 9/2010 | Jung et al. | |
| 2004/0260882 A1 * | 12/2004 | Martinez et al. | 711/133 |
| 2010/0082931 A1 * | 4/2010 | Hatfield | 711/166 |
| 2010/0088468 A1 * | 4/2010 | Agombar et al. | 711/112 |
| 2010/0115218 A1 * | 5/2010 | Hutchison et al. | 711/162 |
| 2010/0257321 A1 | 10/2010 | Gupta | |

OTHER PUBLICATIONS

Benhase et al., "Track Promotion/Demotion to a Cache Store," www.ip.com, IPCOM000100386D, Mar. 15, 2005, 2 pages.
IBM, "Method for Selective Grouping of Extent Scans," www.ip.com, IPCOM00177513D, Dec. 16, 2008, 3 pages.

* cited by examiner

*Primary Examiner* — Christopher Birkhimer (74) *Attorney, Agent, or Firm* — Griffiths & Seaton PLLC (57) ABSTRACT

A plurality of tracks is examined for meeting criteria for a discard scan. In lieu of waiting for a completion of a track access operation, at least one of the plurality of tracks is marked for demotion. An additional discard scan may be subsequently performed for tracks not previously demoted. The discard and additional discard scans may proceed in two phases.

14 Claims, 7 Drawing Sheets

EFFICIENT DISCARD SCANS

BACKGROUND OF THE INVENTION

1. Field of the Invention

The present invention relates generally to computers, and more particularly, to discard scan operations in a computing storage environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. The disk drives may be configured in an array, such as a Redundant Array of Independent Disks (RAID) topology, to provide data security in the event of a hardware or software failure. The data storage systems may be connected to a host, such as a mainframe computer. The disk drives in many data storage systems have commonly been known as Direct Access Storage Devices (DASD). DASD devices typically store data on a track from which information may be recorded and read. Cache memories in computer systems have associated directories of entries of data files. Various kinds of directory scan commands ensure that the directory and associated files in a particular cache are current.

SUMMARY OF THE DESCRIBED EMBODIMENTS

In a data processing system or computing environment, the cache has a directory or hash table of all segments/tracks/pages residing in the cache. Each directory scan may traverse the cache directory in a particular order. Typically, an associated discard scan may have to wait a period of time to complete. As a result, efficiency and productivity may be reduced.

Accordingly, and in view of the foregoing, various exemplary system, and computer program product embodiments for performing a discard scan operation in a more effective manner, are provided. In one embodiment, by way of example only, a plurality of tracks is examined for meeting criteria for a discard scan. In lieu of waiting for a completion of a track access operation, at least one track of the plurality of tracks is marked for demotion. An additional discard scan may be subsequently performed for tracks not previously demoted. The discard scan and additional discard scan may proceed according to two phases.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

A storage system and/or a computing environment may have a cache with a directory or hash table of all segments/tracks/pages residing in the cache. A discard scan may discard or demote tracks of data from the cache directory. There are several cases where a cache discard scan may be performed and executed. For example, release space on a volume may need to discard tracks in cache for that particular volume. A discard scan is then executed for the volume. However, when a discard scan is performed, it waits for track access. Once track access is obtained, the track may be demoted from cache. As a result, a potential majority of the time for the discard scan may be consumed by waiting for track access.

In contrast, and to address the delays previously described, the mechanisms of the illustrated embodiments serve to perform the discard scans without a need to wait for track access. In one embodiment, the discard scan operation is conducted over a first phase and a second phase. In the first phase, a number of tracks are examined to determine if they meet criteria for a discard scan. In lieu of waiting for the track access operation, marking operation(s) are performed to designate the tracks to be demoted, as multiple processes access and demote the data. In the second phase, a cleanup demotion is performed for data not demoted by a subsequent discard scan.

The mechanisms of the illustrated embodiments increase the discard scan efficiency and performance, for example, in an extent space efficient (ESE) FlashCopy relationship. A discard scan may be needed to run during establish and withdraw of a flashcopy relationship on an extent space efficient (ESE) volume. In those cases, the input/output (I/O) may be held for longer periods of time during these discard scans and thus speeds up the discard scans so that the I/O to ESE volumes is not held for longer periods of time during establish/withdraw. During the establish/withdraw of ESE volumes, I/O is quiesced to these volumes. The mechanisms of the illustrated embodiments exploit this feature, and introduce a new highly efficient way of executing the discard scans during ESE volumes flashcopy establish and withdraw operations.

Figure 1:
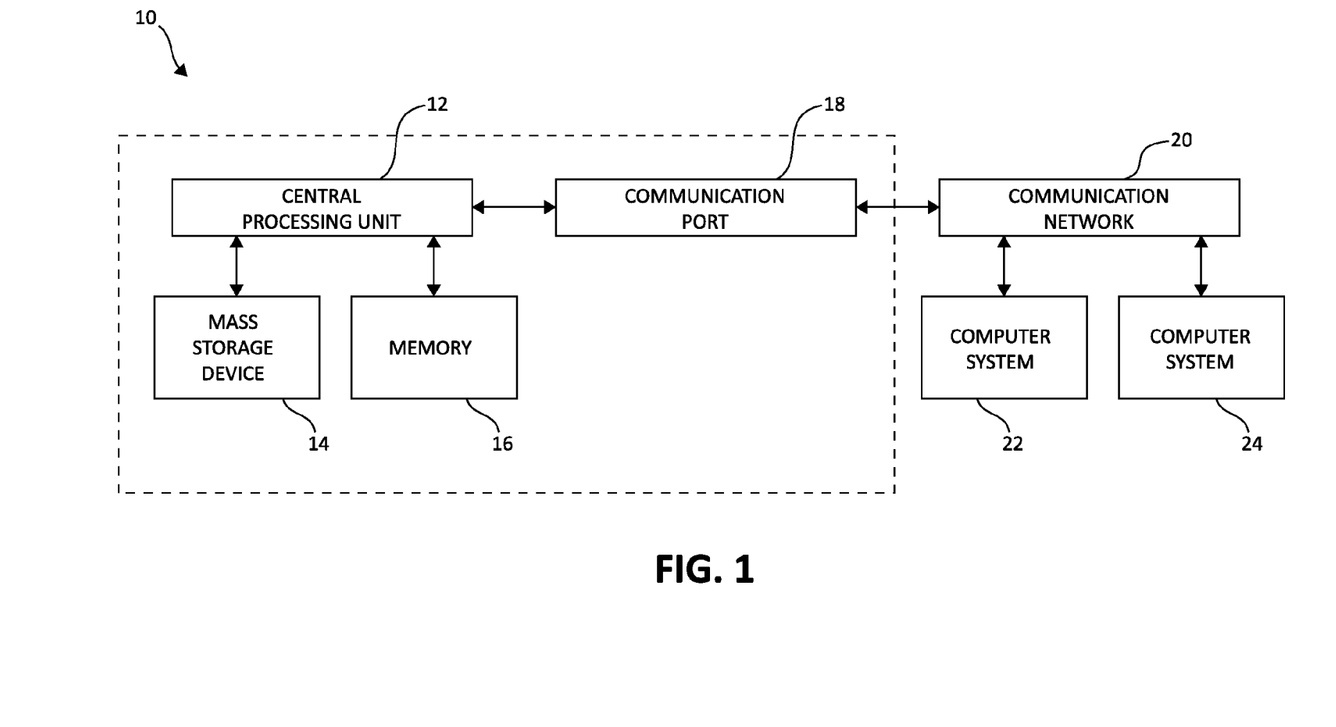
FIG. 1 illustrates a computer storage environment having an example storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
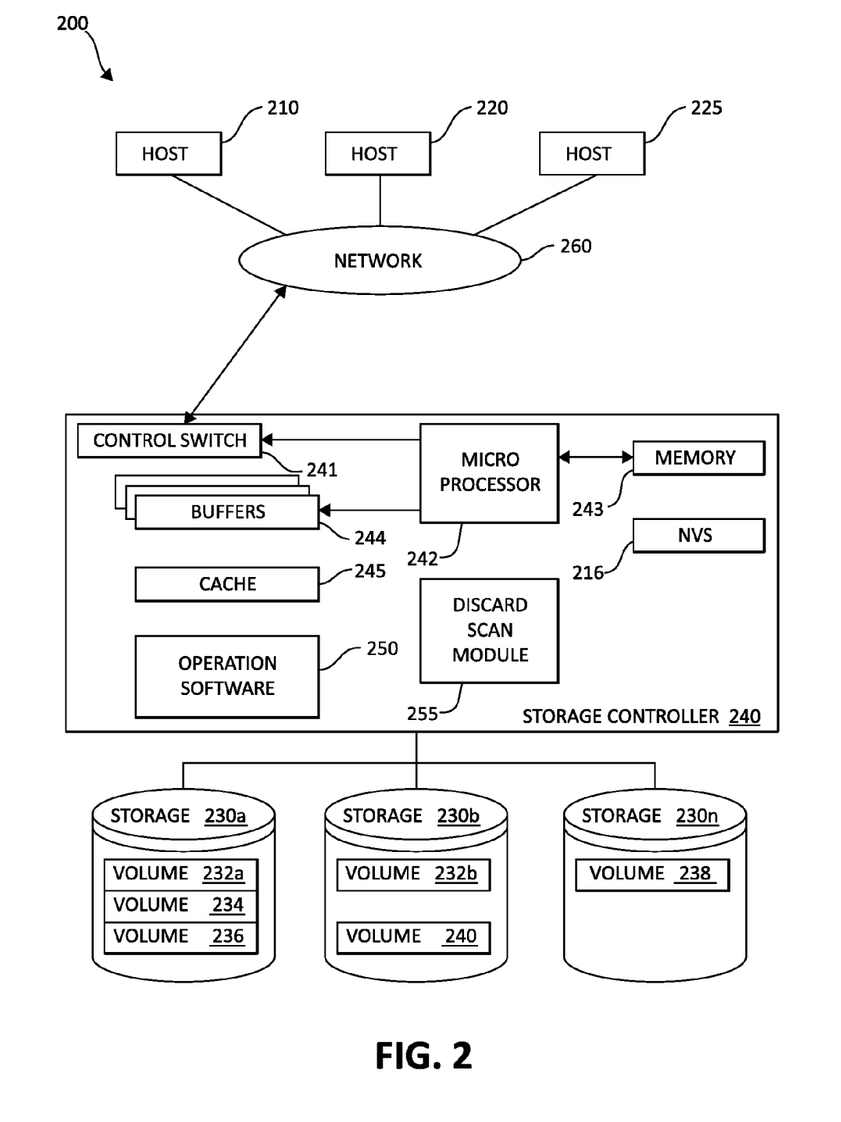
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data which the processor 242 may access for executing functions and method steps associated with managing storage 230 and executing the steps and methods of the present invention for discard scan in a computer storage environment. In one embodiment, system memory 243 includes, is associated, or is in communication with the operation software 250 for performing the discard scans in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230*a*, 230*b* and 230*n* are shown as ranks in data storage system 200, and are referred to herein as rank 230*a*, 230*b* and 230*n*. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 is allocated across ranks 230*a* and 230*b*. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a discard scan module 255 to assist with the discard scan in the computer storage environment. The discard scan module 255 may work in conjunction with each and every component of the storage controller 240, the hosts 210, 220, 225, and storage devices 230. Both the discard scan module 255 may be structurally one complete module in a computer storage environment or may be associated and/or included with other individual modules illustrated in the computer storage environment. The Discard scan module 255 may also be located in the cache 245 or other components of the storage controller 240 to accomplish the purposes of the present invention.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and discard scan module 255 in which information may be set. Multiple buffers 244 may be implemented with the present invention to assist with the discard scan operations as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, and discard scan module 255 are in communication with each other and may be separate or one individual component(s). Also, several, if not all of the components, such as the operation software 245 may be included with the memory 243 for performing the discard scan operations. Each of the components within the devices shown may be linked together and may be in communication with each other for purposes suited to the present invention.

Figure 3:
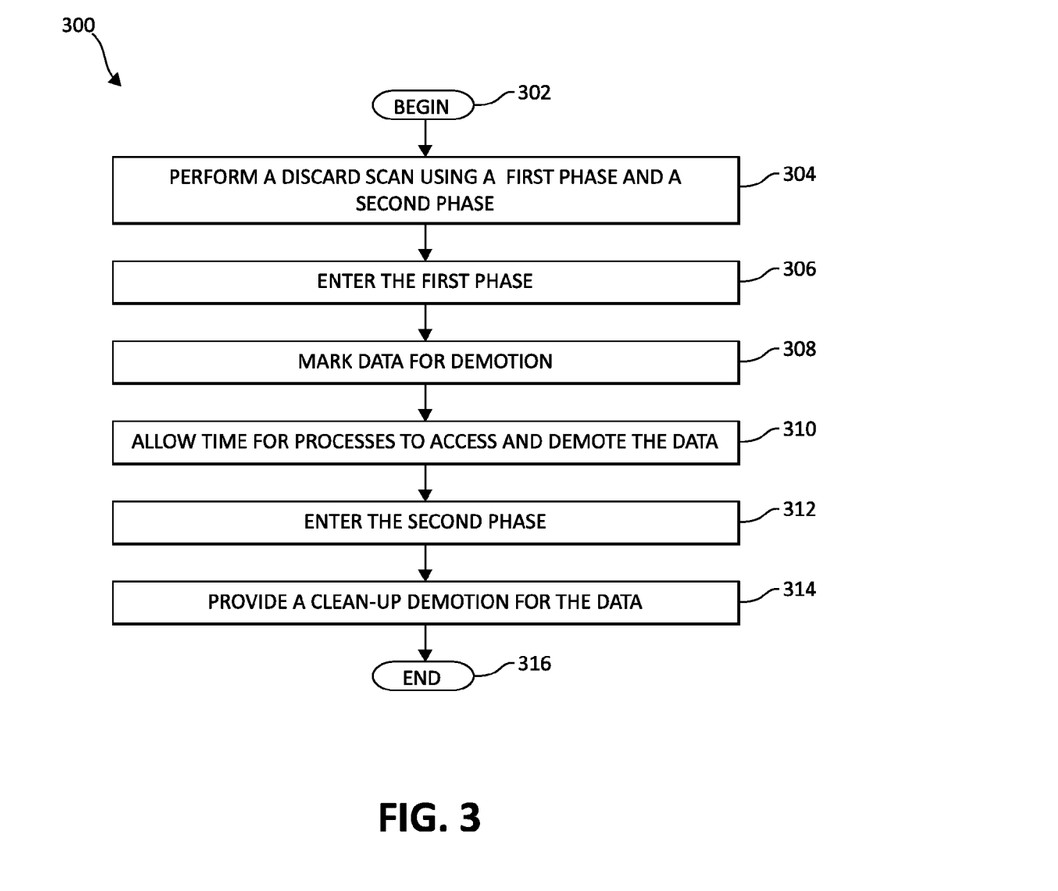
FIG. 3 is a flowchart illustrating an exemplary method for performing a discard scan.

FIG. 3 is a flowchart illustrating an exemplary method for performing a discard scan operation in accordance with one embodiment. In the present embodiment, the mechanisms of the present invention are directed towards a two phase or two period discard scan, for example, a discard scan performed in two phases for flash copy extent space efficient (ESE) volumes. In the first phase, when a discard scan needs to wait for a track access, instead of only waiting for track access, the mechanisms sets a bit in the track which marks it for demotion on an end of track access. Time is allowed for other processes to access and demote data. In the second phase, discard scan will wait for track access, if the track access may not be obtained immediately. The second phase may be optional. For example, if all the data is demoted in the first phase, the second phase may not necessarily be performed. It may also be required, if needed. The track may be demoted after the track access is obtained.

The method 300 begins (step 302), by performing a discard scan, for example, a discard scan for a flashcopy extent space efficient (ESE) volumes, using a first and second phase (step 304). The discard scan may be performed in two phases. The first phase is entered (step 306). Tracks are marked for demotion (step 308). This may be performed by setting a bit in the track. Time is allowed, if necessary, for multiple processes to access and demote the data (step 310). The second phase is now entered (step 312). This may be unnecessary in the event all the data is the first phase was actually demoted in the first phase. In the second phase, the method 300 provides a cleanup demotion for the data (step 314). This may include the discard scan waiting for track access, if the track is unable to be obtained. The track may then be demoted upon obtaining track access to the track. Thus, data that was not demoted in the first phase may be demoted in the second phase. The method 300 ends (step 316).

As previously mentioned, the mechanisms of the illustrated embodiments may perform the discard scan operations in two phases. In an additional exemplary embodiment, in the first phase, the cache discard scan starts in the hash table which marks the beginning of the extent range of tracks that need to be discarded and continues until the end of the extent range. During this first phase, when a discard scan needs to wait for a track access, instead of waiting it sets a bit in the track which marks it for demotion on end track access. At this time two indicators indicating first and last index in the hash table are updated.

In one embodiment, when the second phase is entered, the mechanisms of the present invention scan the hash table between the first and the last indexes recorded in the first phase. During this second phase, the discard scan will wait for track access, if the track access may not be obtained immediately. After the track access is obtained, the track may be demoted. The first scan (performed in the first phase) will quickly finish since waiting is eliminated and the tracks are marked for demotion. Processes that have access to those tracks will demote these tracks at the time of end of track access. As a result, by the time second scan (second phase) is started most, if not all, of the tracks have previously been demoted. Thus, a second scan may not be necessary, but if required, the second discard scan may complete and quickly finish.

Figure 4:
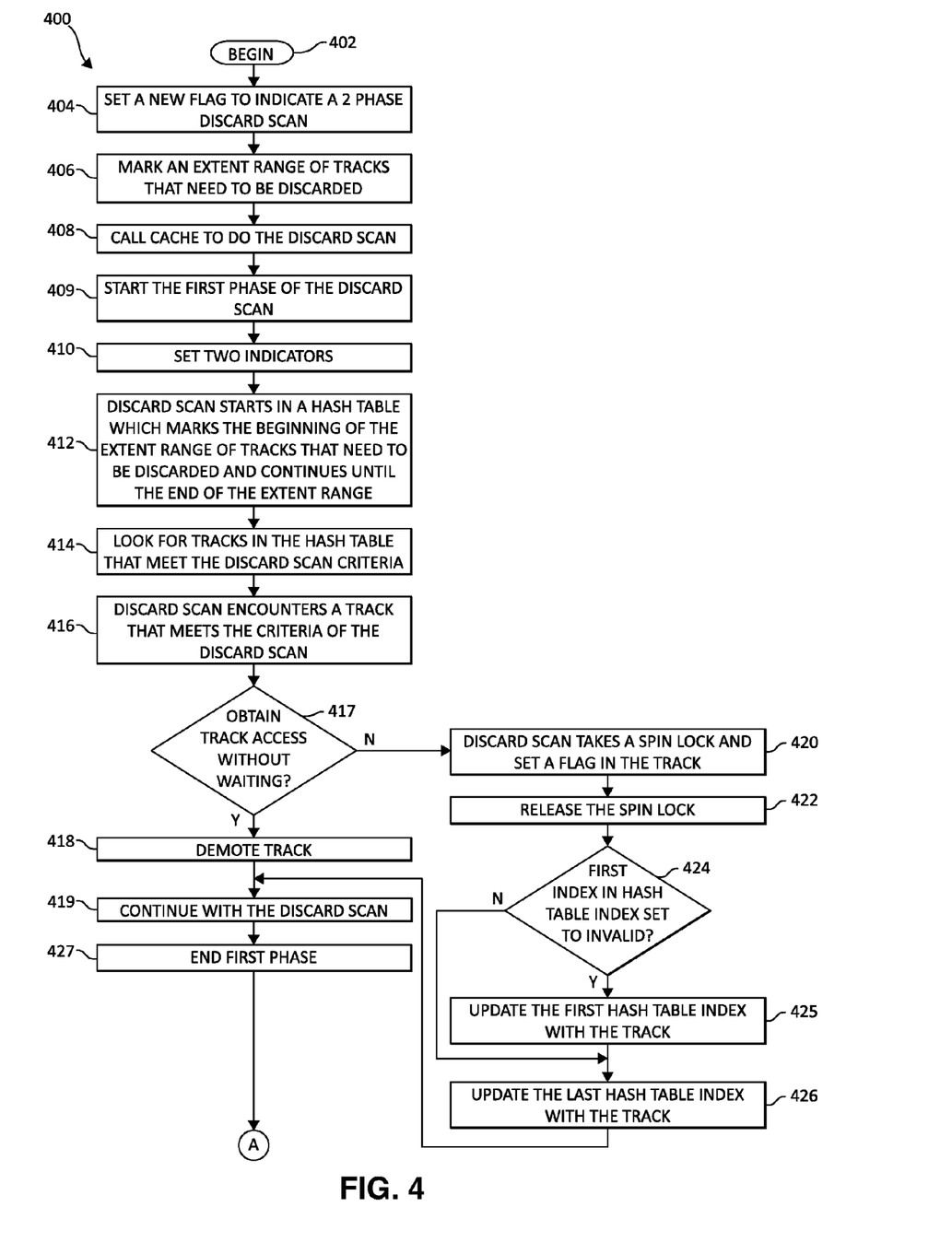
FIG. 4 is a flowchart illustrating an exemplary method for performing a discard scan in a first and second phase.

FIG. 4 is a flowchart illustrating an exemplary method 400 for performing a discard scan in a first and second phase. The method 400 begins (step 402) by setting a new flag to indicate a 2 phase discard scan process (step 404). For example, copy services may set a new flag to indicate a 2 phase discard scan for the ESE volumes at discard scan establish and withdraw. An extent range of tracks needing to be discarded are marked (step 406). The method will call cache to perform the discard scan (step 408). The first phase is started for the discard scan (step 408). The method 400 will set two indicators (step 410). These indicators may be in the hash table/task control block (TCB). The discard scan starts in a hash table and the discard scan will mark the beginning of the extent range of tracks that need to be discarded and continue until the end of the extent range (step 412). The method will look for tracks in the hash table that meet the discard scan criteria (step 414). When the discard scan encounters a track that meets the criteria of the discard scan (step 416), the method 400 will determine if a track access is obtainable without a wait period (step 417). If the track access is obtainable, the method 400 will demote the track (step 418) and continue with the discard scan (step 419). If the track access is not obtainable, the method 400 will take a spin lock (take by the discard scan) and set a flag in the track (step 420). The spin lock is released (step 422). The method 400 will determine if a first index in a hash table index is set to invalid (step 424). If no, the method 400 will update the last hash table index with the track (step 426). If yes, the method 400 will update the first hash table index with the track (step 425). The last hash table index is updated for the track (step 426). The method 400 will then continue with the discard scan (step 419). The method 400 will then end the first phase of the discard scan (step 427). It should be noted that the processes that have access to the marked tracks will demote the marked tracks at the time of end track access. This results in most, if not all of the tracks, actually being demoted at the end of the track access during the first phase, even though the discard scan continued without waiting for the track access.

At this point, the method 400 will determine if the first hash table index has a valid value (step 428). If no, the method ends (step 442). If yes, a second phase is started for the discard scan (step 430). The discard scan is started in the second phase from the first index in the hash table index and continue until the last hash table index (step 432). The method 400 will look for tracks in the hash table that meet the discard scan criteria (step 434). The method 400 will determine if the discard scan encounters a track that meets the criteria of the discard scan (step 436). If no, the method 400 will end (step 442). If yes, the method 400 will wait for track access (step 437). The track access is obtained (step 438). The tracks are demoted and the discard scan continues (step 439). The second phase discard scan ends (step 440). The method 400 ends (442).

Figure 5:
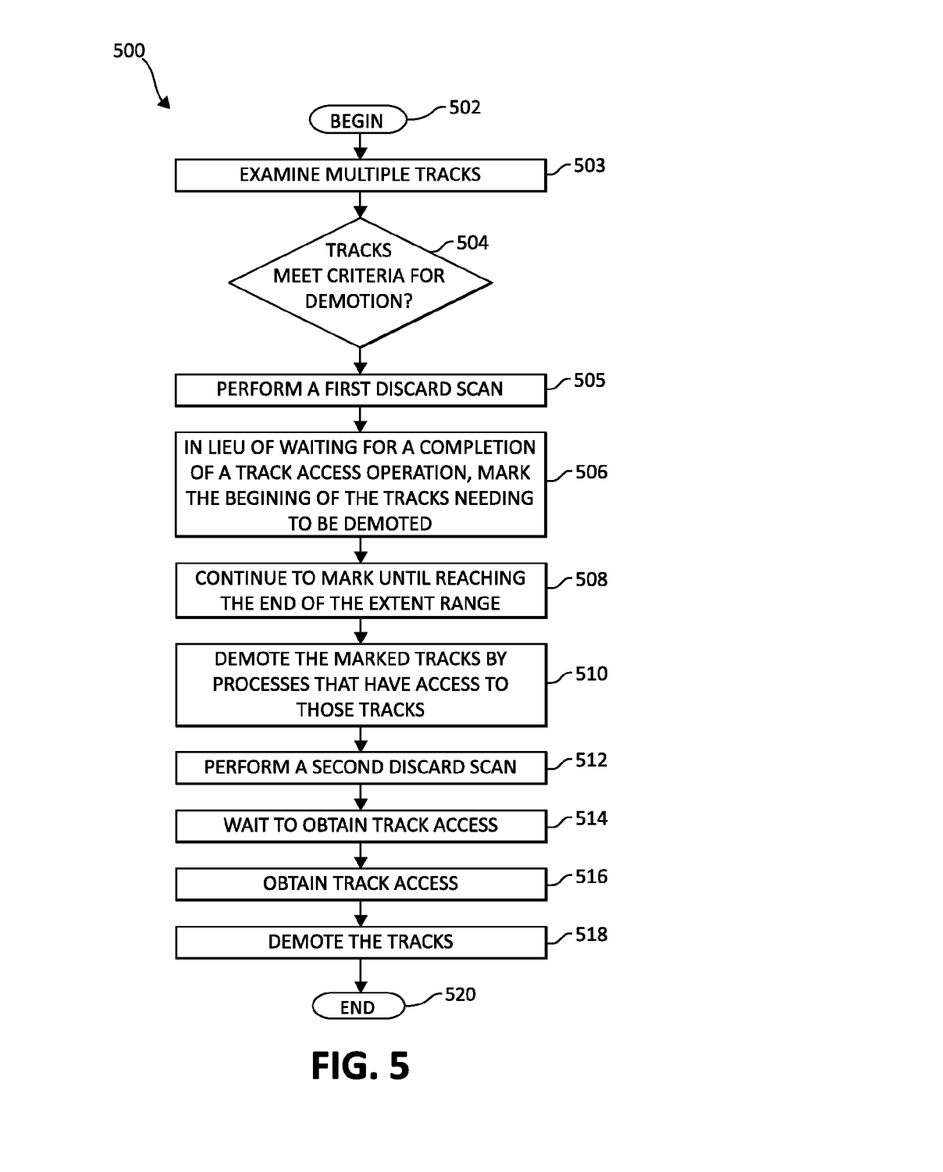
FIG. 5 is a flowchart illustrating an exemplary method for performing a discard scan in a first and second phase.

In one embodiment, the mechanisms may perform the ESE discard scans for establish flashcopy and withdraw flashcopy, since input/output (I/O) is quiesced during the scans. Thus, the second discard scan should not encounter many tracks needed for demotion. FIG. 5 is a flowchart illustrating an exemplary method 500 for performing a discard scan in a first and second phase. Such a discard scan may be performed for flashcopy extent space efficient volumes. The method begins (step 502) by examining multiple tracks (step 503). The method 500 checks to see if any of the tracks meet the criteria for a discard scan (step 504). A first discard scan is performed (step 505). In lieu of waiting for a completion of a track access to perform the discard scan, the beginning of the tracks needing to be demoted (those that meet the discard scan criteria) are marked (step 506). The method 500 will continue to mark until reaching the end of the tracks (step 508). The method will demote the marked tracks by processes that have access to those tracks that are marked (step 510). The demotion of the marked tracks may occur at the end of track access. The method 500 will perform a second discard scan (step 512). The second discard scan may wait to obtain track access (step 514). Unlike the first discard scan, the second discard scan may actually wait to obtain the track access. After the required wait time, the second discard scan will obtain the track access (step 516). The method 500 will demote the tracks (step 518). The method 500 ends (step 520).

As a result of the two phase discard scans, the first scan will finish quickly since it does not have to wait and the discard scan may mark all the tracks for demotion. Processes that have access to those tracks may demote these tracks at the time of end access. Thus, allowing time for demotion of the tracks may or may not be necessary. As a result, by the time second scan is started most of the tracks are already demoted. So now, the second scan may finish quickly.

In one embodiment, the mechanism may perform an ESE discard scans for establish flashcopy and withdraw flashcopy, since I/O is quiesced during these scans. As a result, the second scan should not encounter many tracks that need to be demoted. During the scanning process, a new flag is set, for example by copy services, to indicate a two-phase discard scan for ESE volumes only for the discard scan at establish and withdraw portions of the flashcopy operation, for example. The copy services marks the extent range of tracks that need to be discarded. Copy services may call a cache to perform the discard scan. The cache starts the first phase of the discard scan and sets two indicators in the task control block (TCB), with the first hash table index and last hash table index set to an invalid value. The discard scan starts in the hash table which marks the beginning of the extent range of tracks needing to be discarded and continues until the end of the extent range. The discard scan looks for tracks in the hash table that meet the discard scan criteria. If the discard scan encounters a track that meets the criteria of the discard scan, it tries to obtain track access without wait. If the track access is obtained, then the track is demoted and the discard scan continues. If the track access may not be obtained without wait, the discard scan takes a spin lock and sets a 'demotion in progress' flag in the track and then releases the spin lock. If the first hash table index is set to invalid in the TCB, the will update the first hash table index with this track. Also, the last hash table index is updated with this track.

Once the first phase of the discard scan is finished, the mechanisms will check if the first hash table index has a valid value. If the value is invalid the discard scan is finished, otherwise, the second phase of the discard scan is started. The second phase of the discard scan starts from the first hash table index and continues until the last hash table index. The discard scan looks for tracks in the hash table that meet the discard scan criteria. If the discard scan encounters a track that meets the criteria of the discard scan, it obtains track access by waiting for the track access. Once the track access is obtained, track is demoted and the discard scan continues.

In one embodiment serialization of discard scans is maintained. For example, the copy services will not issue a discard scan for an establish on a volume until the discard scan for withdraw on a volume is complete. Similarly, copy services will not issue a discard scan for withdraw on a volume until discard scan for establish on a volume is finished. This is to prevent discard scans from finishing out of order. In one embodiment, if a track is to be destaged and the 'demotion in progress' flag is set, the mechanisms of the illustrated embodiments will skip the destage and discard the track. When a TCB ends track access to a track, if the 'demotion in progress' flag is set, the track is discarded.

As will be discussed below, the discard scan(s) may be based on serialization protocols for performing the discard scan(s). The mechanisms, described herein, may prevent the issuance of a discard scan for establish on a volume and for an issuance for a discard scan for withdraw on a volume, based upon theses serialization protocols.

Figure 6:
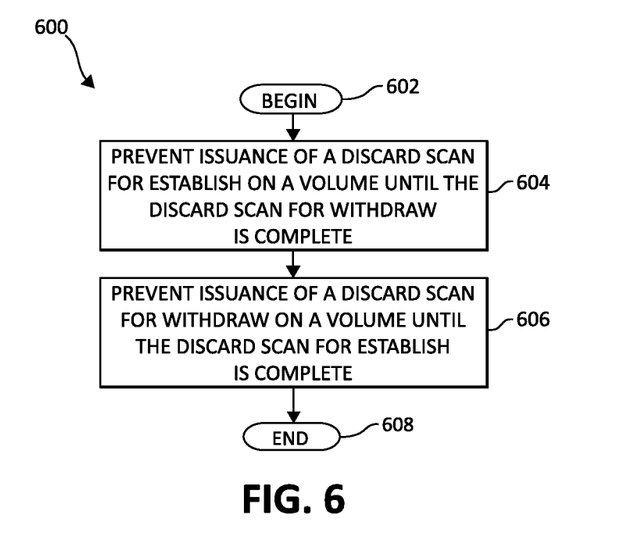
FIG. 6 is a flowchart illustrating an exemplary method for serialization of the discard scans.

FIG. 6 is a flowchart illustrating an exemplary method 600 for serialization of the discard scans. In one embodiment, in conjunction with setting the flag to indicate the first phase and the second phase, the mechanisms may issue the discard scan(s) based on a serialization for discard scan protocols. The method 600 begins (step 602) with preventing the issuance of a discard scan for establish on a volume until the discard scan for withdraw is complete (step 604). The method 600 will also prevent an issuance for a discard scan for withdraw until discard scan for establish is finished (step 606). The method ends (step 608). As previously mentioned, the serialization of the discard scan is designed to prevent discard scans from finishing out of order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for performing a discard scan operation in a computing storage environment, comprising:
   a processor device operable in the computing storage environment, wherein the processor device is adapted for:
   examining a plurality of tracks in a hash table for meeting a criteria for a discard scan,
   in lieu of waiting for a completion of a track access operation, marking at least one of the plurality of tracks for demotion by setting a bit in the hash table indicating a beginning of an extent range and an end of the extent range in the at least one of the plurality of tracks,
   in response to the track access operation not being complete after the step of marking, taking a spin lock and setting a flag on one track of the plurality of tracks and releasing the spin lock after setting the flag, and
   in response to the track access operation not being complete and after the step of marking, continuing to perform the step of marking on another one of the plurality of tracks for demotion by setting another bit in the hash table.

2. The system of claim 1, wherein the processor device is further adapted for performing the marking in a first phase.

3. The system of claim 2, wherein the processor device is further adapted for performing a cleanup demotion by a subsequent discard scan for those of the at least one of the plurality of tracks not demoted previously, wherein the subsequent discard scan is performed in a second phase.

4. The system of claim 2, wherein the processor device is further adapted for:
   updating a first index and a last index in the hash table.

5. The system of claim 3, wherein the processor device is further adapted for performing at least one of:
   scanning the hash table between a first index and a last index, and
   setting a flag on the hash table to indicate the first phase and the second phase.

6. The system of claim 5, wherein the processor device is further adapted for, in conjunction with the setting the flag to indicate the first phase and the second phase, performing the steps of
   taking the spin lock, and
   releasing the spin lock.

7. The system of claim 1, further including a flashcopy extent space-efficient volume in communication with the processor device, wherein the discard scan is performed for the flashcopy extent space-efficient volume.

8. The system of claim 1, wherein the processor device is further adapted for performing at least one of:
   issuing the discard scan based on a discard scan serialization protocol, skipping a destage and discarding the at least one of the plurality of tracks if the at least one of the plurality of tracks is to be destaged with a set flag, and discarding the at least one of the plurality of tracks when the track access operation ends.

9. A computer program product for performing a discard scan operation in a computing storage environment by a processor device, the computer program product comprising a non-transitory computer-readable storage medium having computer-readable program code portions stored therein, the computer-readable program code portions comprising:

a first executable portion for examining a plurality of tracks in a hash table for meeting a criteria for a discard scan;

a second executable portion for, in lieu of waiting for a completion of a track access operation, marking at least one of the plurality of tracks for demotion by setting a bit in the hash table indicating a beginning of an extent range and an end of the extent range in the at least one of the plurality of tracks;

a third executable portion for, in response to the track access operation not being complete after the step of marking, taking a spin lock and setting a flag on one track of the plurality of tracks and releasing the spin lock after setting the flag, and a fourth executable portion for, in response to the track access operation not being complete and after the step of marking, continuing to perform the step of marking on another one of the plurality of tracks for demotion by setting another bit in the hash table.

10. The computer program product of claim 9, further including a fifth executable portion for performing the marking in a first phase.

11. The computer program product of claim 10, further including a sixth executable portion for performing a cleanup demotion by a subsequent discard scan for those of the at least one of the plurality of tracks not demoted previously, wherein the subsequent discard scan is performed in a second phase.

12. The computer program product of claim 10, further including a sixth executable portion for:

updating a first index and a last index in the hash table.

13. The computer program product of claim 11, further including a seventh executable portion for performing at least one of:

scanning the hash table between a first index and a last index, setting a flag in the hash table to indicate the first phase and the second phase, and in conjunction with the setting the flag to indicate the first phase and the second phase, performing the steps of:

taking the spin lock, and releasing the spin lock.

14. The computer program product of claim 9, further including a fifth executable portion for performing at least one of:

issuing the discard scan based on a discard scan serialization protocol, skipping a destage and discarding the at least one of the plurality of tracks if the at least one of the plurality of tracks is to be destaged with a set flag, and discarding the at least one of the plurality of tracks when the track access operation ends.

* * * * *